US012759693B2

(12) United States Patent
Seminel

(10) Patent No.: US 12,759,693 B2
(45) Date of Patent: Oct. 13, 2026

(54) PROPELLER ASSEMBLY

(71) Applicant: Ratier-Figeac SAS, Figeac Cedex (FR)

(72) Inventor: Bruno Seminel, Figeac (FR)

(73) Assignee: RATIER-FIGEAC SAS, Figeac Cedex (FR)

( * ) Notice: Subject to any disclaimer, the term of this patent is extended or adjusted under 35 U.S.C. 154(b) by 0 days.

(21) Appl. No.: 19/053,469

(22) Filed: Feb. 14, 2025

(65) Prior Publication Data

US 2025/0289562 A1 Sep. 18, 2025

(30) Foreign Application Priority Data

Mar. 14, 2024 (EP) .................................... 24305386

(51) Int. Cl.
*B64C 11/00* (2006.01)
*B64C 11/38* (2006.01)
*B64C 11/44* (2006.01)

(52) U.S. Cl.
CPC .......... *B64C 11/008* (2013.01); *B64C 11/385* (2013.01); *B64C 11/44* (2013.01)

(58) Field of Classification Search
CPC ..... B64C 11/346; B64C 11/38; B64C 11/385; B64C 11/44
See application file for complete search history.

(56) References Cited

U.S. PATENT DOCUMENTS 2,146,334 A * 2/1939 De Caria .............. B64C 11/346 416/53
4,913,623 A * 4/1990 Schilling ............... B64C 11/346 416/129
6,113,351 A * 9/2000 McCallum ............ F04D 27/002 416/175
9,458,730 B2 10/2016 Carvalho
9,598,169 B1 * 3/2017 LeGrand, III .......... B64C 13/00
(Continued)

FOREIGN PATENT DOCUMENTS

FR 3005685 A1 * 11/2014 ........... F01D 5/3092
FR 3005686 A1 * 11/2014 ........... F04D 29/322
(Continued)

OTHER PUBLICATIONS

European Search Report for Application No. 24305386.5, mailed Aug. 20, 2024, 8 pages.

*Primary Examiner* — Ryan C Clark
(74) *Attorney, Agent, or Firm* — CANTOR COLBURN LLP

(57) ABSTRACT

A variable pitch aircraft propeller assembly includes: a plurality of propeller blades and at least one counter-weight arrangement mounted on a propeller blade. The counter-weight arrangement comprises: a first counter-weight and a second counter-weight. The counter-weights are arranged such that when the propeller blade is in fine pitch, the counter-weights are in a first position with respect to the plane of rotation of said propeller blade, and when the propeller blade is substantially feathered, the counter-weights are in a second position with respect to the plane of rotation of said propeller blade. The counter-weights are aligned such that a line drawn between the center of mass of the first counter-weight and the center of mass of the second counter-weight is substantially perpendicular to a longitudinal axis of the propeller blade.

15 Claims, 8 Drawing Sheets

(56) References Cited

U.S. PATENT DOCUMENTS

| | | | | |
|---|---|---|---|---|
| 9,896,189 | B2 * | 2/2018 | Tajan | B64C 11/346 |
| 9,938,000 | B2 * | 4/2018 | Tajan | B64C 11/346 |
| 10,953,978 | B2 * | 3/2021 | Fages | B33Y 80/00 |
| 2014/0193253 | A1 * | 7/2014 | Carvalho | B64C 11/346<br>416/140 |
| 2017/0313406 | A1 * | 11/2017 | Lassalle | B64C 11/40 |
| 2023/0021280 | A1 * | 1/2023 | Daggett | F02C 3/06 |

FOREIGN PATENT DOCUMENTS

| | | | | | |
|---|---|---|---|---|---|
| FR | 3006988 | A1 | * | 12/2014 | F04D 29/36 |
| FR | 3008676 | A1 | * | 1/2015 | B64C 11/346 |
| FR | 3011529 | A1 | * | 4/2015 | B64C 11/346 |
| FR | 3032422 | A1 | * | 8/2016 | B64C 11/346 |
| FR | 3032423 | A1 | * | 8/2016 | B64C 11/306 |
| GB | 124935 | A | * | 4/1919 | B64C 11/346 |
| GB | 2218747 | A | * | 11/1989 | B64C 11/346 |
| WO | 2014132002 | A2 | | 9/2014 | |
| WO | 2014132002 | A3 | | 11/2014 | |

* cited by examiner

PROPELLER ASSEMBLY

CROSS-REFERENCE TO RELATED APPLICATIONS

This application claims the benefit of European Patent Application No. 24305386.5 filed Mar. 14, 2024, the disclosure of which is incorporated herein by reference in its entirety.

FIELD

This disclosure relates to a variable pitch propeller assembly. This disclosure further relates to a counter-weight arrangement for use in a variable pitch propeller assembly.

BACKGROUND

Variable pitch aircraft propeller assemblies may be fitted with propeller blades that each have a counter-weight arrangement mounted thereon. These counter-weight arrangements protrude from one side of the blade.

The counter-weight arrangements provide a torsional force to the blades, biasing the blades towards a feathered position when the propeller is spinning as a result of centrifugal forces. Blade pitch is controlled using an actuator which acts against the biasing force of the counter-weight arrangements. Since the counter-weight arrangements bias the blades towards a feathered position, in the event of an actuator failure, the blades will move to a feathered position, reducing the drag of the failed propeller blades and reducing the windmilling of the propeller (the continued rotation of the propeller due to aerodynamic forces) which is advantageous for maintaining aircraft controllability and reducing the risk of overspeed.

In addition to the desired torsional force, existing counter-weight arrangements can also exert a bending force on the blades which can create high local stresses on the blade. As such, the blade may need to be strengthened to account for this high bending stress, leading to increased mass, which, in aircraft design, is disadvantageous.

SUMMARY

According to this disclosure, there is provided a variable pitch aircraft propeller assembly. The assembly includes: a plurality of propeller blades configured to rotate in a plane of rotation so as to generate thrust in a direction perpendicular to the plane of rotation. Each propeller blade is configured to be linked to an actuator which controls the pitch of the propeller blade. The assembly also includes: at least one counter-weight arrangement mounted on a propeller blade. The at least one counter-weight arrangement includes a first counter-weight and a second counter-weight.

The counter-weights can arranged such that when the propeller blade is in fine pitch, the counter-weights are in a first position with respect to the plane of rotation of said propeller, and when the propeller blade is substantially feathered, the counter-weights are in a second position with respect to the plane of rotation of said propeller.

The counter-weights can be are aligned such that a line drawn between the center of mass of the first counter-weight and the center of mass of the second counter-weight is substantially perpendicular to a longitudinal axis of the propeller blade.

It will be understood that the variable pitch propeller assembly may comprise propeller blades which are configured to rotate in different, but (e.g. substantially) parallel, planes of rotation such that every blade generates thrust in a common direction which is perpendicular to each of the planes of rotation. For example, in contra-rotating propeller assemblies, two sets of blades are present which rotate in parallel planes of rotation. In other examples, propeller blades may be offset along the axis of rotation such that each propeller blade has a different (but substantially parallel) plane of rotation.

It will be understood that references to the position of the counter-weights may refer to the position of the centre of mass of the counter-weight.

It will be understood that the substantially feathered position is a position in which the pitch angle (e.g. β¾ angle) of the propeller blade is approximately 90 degrees (e.g. between 70 and 100 degrees, preferably between 85 and) 90° and is the position in which the propeller blade produces low wind-milling RPM with no power applied to the propeller blade. This is also a position in which the propeller blade produces a low amount of drag. The feathered position may be set depending on whether the lowest drag or lowest wind-milling RPM is preferred these typically occur at slightly different pitch angles.

In examples, each propeller blade comprises a blade root and a blade spar.

In examples, the counter-weight arrangement is mounted on the blade root.

In examples, the counter-weight arrangement is mounted on the blade spar.

In examples, the second position is closer to the plane of rotation than the first position. Such examples may be examples (e.g. on an aeroplane) where the propeller is a configured to generate forward thrust. In such examples, the counter-weight arrangement may be configured to bias the blades towards course pitch.

In examples, the first position is closer to the plane of rotation than the second position. Such examples may be examples (e.g. on a helicopter) where the propeller is configured to generate upward thrust (i.e. lift). In such examples, the counter-weight arrangement may be configured to bias the blades towards flat pitch.

In examples, the counter-weights are aligned such that a line drawn between the centre of mass of the first counter-weight and the centre of mass of the second counter-weight perpendicularly bisects a longitudinal axis of the propeller blade.

In examples, the counter-weight arrangement comprises a first arm protruding from the propeller blade and having the first counter-weight mounted thereon, and a second arm protruding from the propeller blade and having the second counter-weight mounted thereon. In examples, the arm and counter-weight are formed as a unitary part. In examples, the arm and counter-weight are formed as separate parts.

In examples (e.g. examples where the plurality of blades comprises a small number of blades (e.g. 2, 3, or 4 blades)) every propeller blade has a counter-weight arrangement mounted thereon.

In examples (e.g. examples where the plurality of blades comprises a large number of blades (e.g. more than 5 blades)), the assembly may comprise an even number of propeller blades, and every other (e.g. every second, e.g. alternating) propeller blade may have a counter-weight mounted thereon.

In examples (e.g. examples where the plurality of blades comprises a large number of blades (e.g. more than 5 blades)), the assembly may comprise a number of propeller blades which is a multiple of 3, and every third propeller blade may have a counter-weight mounted thereon.

In embodiments, the counter-weight arrangement is substantially (e.g. entirely) symmetrical about the longitudinal axis of the propeller blade on which it is mounted. It will be understood that the longitudinal axis of the propeller blade is the axis defined between the blade root and the blade tip.

In examples, each of the plurality of propeller blades is configured to be linked (e.g. coupled) to a common actuator.

In examples, the counter-weights comprise a material (e.g. tungsten, tungsten alloy, etc.) having a density between 15 and 20 g/cm3.

According to this disclosure there is provided a system comprising a variable pitch propeller assembly as described above, and one or more actuators configured to adjust the pitch of one or more of the propeller blades.

In examples, the system comprises a common actuator configured to adjust the pitch of each of the propeller blades.

In embodiments, the actuator is bi-directional (i.e. the actuator is configured to provide a force to move the propeller blade(s) to a more coarse pitch angle, and to provide a force to move the propeller blade(s) to a more fine pitch angle). It will be understood that coarse pitch is an increased pitch angle (i.e. towards feathered) and fine pitch is a decreased pitch angle (i.e. towards flat pitch).

In examples, the actuator system is configured to provide sufficient force to substantially feather the propeller blades in the event of a single blade counter-weight arrangement failure or loss. A counter-weight failure or loss may be understood to include the situation where the connection between a blade and the actuator (e.g. the trunnion) fails such that the biasing force from the counter-weight arrangement mounted on said blade does not act to bias the other blades (via the actuator).

In examples, the actuator is a hydraulic actuator.

In examples, the actuator is an electrical actuator.

Also disclosed is a counter-weight arrangement for use in a variable pitch propeller assembly comprising a plurality of blades each configured to rotate in a plane of rotation so as to generate thrust in a direction perpendicular to the plane of rotation. The counter-weight arrangement includes: a first counter-weight and a second counter-weight. The counter-weights are arranged such that when the counter-weight arrangement is installed on a propeller blade, and the propeller blade is in fine pitch, the counter-weights are in a first position with respect to the plane of rotation of said propeller blade, and when the propeller blade is feathered, the counter-weights are in a second position with respect to the plane of rotation of said propeller blade, wherein the second position is closer to the plane of rotation than the first position. The counter-weights are aligned such that a line drawn between the center of mass of the first counter-weight and the center of mass of the second counter-weight is substantially perpendicular to a longitudinal axis of the propeller blade.

It will be appreciated that the counter-weight arrangement may (and preferably does) include one or more (e.g. all) of the preferred and optional features disclosed herein, e.g. relating to other examples, as applicable.

BRIEF DESCRIPTION OF DRAWINGS

One or more non-limiting examples will now be described, by way of example only, and with reference to the accompanying figures in which.

DETAILED DESCRIPTION

The below described embodiments will be understood to be exemplary only.

It will be understood that in the Figures, schematic representations of propeller blades are provided which do not show the axial (e.g. spanwise) twist which would be present on conventional aircraft propeller blades.

It will be understood that where referred to herein, the propeller pitch angle refers to the β¾ angle which is a well-known term in the art. Since conventional propeller blades are twisted along their longitudinal axis such that the angle of between the plane of rotation and the chord line will vary along the length of the propeller blade, the β¾ angle is the angle between the plane of rotation and the propeller blade chord line at the point on the blade which is ¾ of the total span length of the blade from the propeller axis to the blade tip. It will be understood that the propeller axis is the axis about which the propeller rotates in order to generate thrust. Flat Pitch is a propeller pitch angle of approximately zero degrees. The feathered position corresponds to a pitch angle of approximately 90 degrees (e.g. between 85 and 90 degrees preferably) and is the position in which a propeller blade produces a low (e.g. the lowest) wind-milling RPM with no power applied to the propeller blade. This is also a position in which the propeller blade produces a low amount of drag. Coarse pitch is an increased pitch angle (i.e. towards feathered). Fine pitch is a decreased pitch angle (i.e. towards flat pitch).

Aircraft may comprise variable pitch propellers. In many variable pitch propeller assemblies, each propeller blade is provided with a counter-weight arrangement mounted thereon. The purpose of the counter-weight arrangement is to provide a torsional force to bias the propeller blade towards a feathered position. Propeller blades are also linked to an actuator which at least provides a torsional force in the opposite direction to that provided by the counter-weight. By balancing the force from the actuator against the force from the counter-weight arrangement (as well as other forces on the blade, e.g. aerodynamic, centrifugal and friction forces), the pitch of the propeller blade can be controlled.

Figure 1:
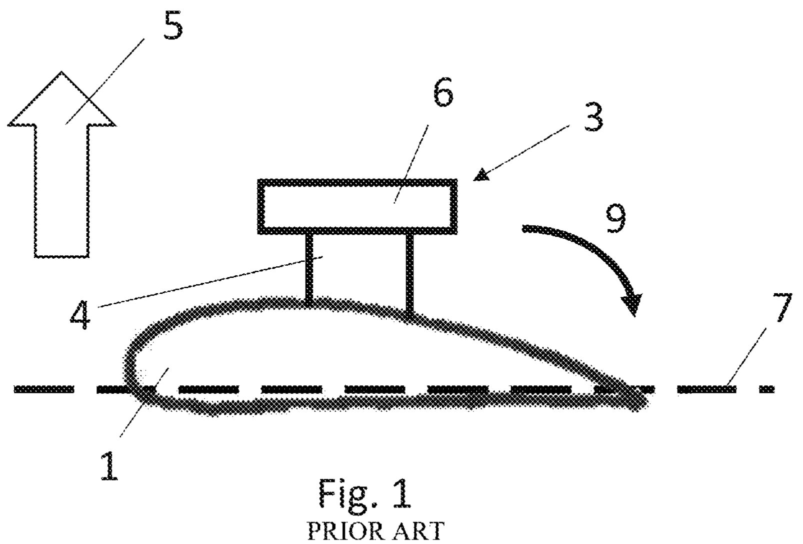
Fig. 1 PRIOR ART
FIG. 1 shows a schematic cross section of a prior art counter-weighted propeller blade in flat pitch.

FIG. 1 schematically illustrates a cross-section of a conventionally counter-weighted propeller blade, in a cross-sectional plane perpendicular to the longitudinal axis of the propeller blade. The propeller blade 1 has mounted thereon a counter-weight arrangement 3 comprising an arm 4 and a counter-weight 6. The arrow 5 illustrates the direction of travel of the aircraft, and the line 7 illustrates the plane of rotation of the propeller blade 1. The plane of rotation 7 is the plane in which the propeller blade 1 rotates (about the axis of rotation of the propeller assembly) so as to generate thrust in a direction perpendicular to the plane of rotation.

The counter-weight 6 is arranged such that when the propeller blade 1 is in fine pitch, the counter-weight 6 is outside of the plane of rotation 7, and when the propeller blade 1 is feathered, the counter-weight 6 is inside of the plane of rotation.

In FIG. 1, the propeller blade 1 is in flat pitch. As such, the counter-weight arrangement is outside of the plane of rotation, in front of the propeller blade 1 (with respect to the direction of travel 5). When the propeller is spinning, a component of the centrifugal force on the counter-weight 6 acts to move the counter-weight 6 into the plane of rotation 7, as shown by arrow 9. As such, the centrifugal force on the counter-weight 6 acts to bias the propeller blade 1 towards the feathered position.

Figure 2:
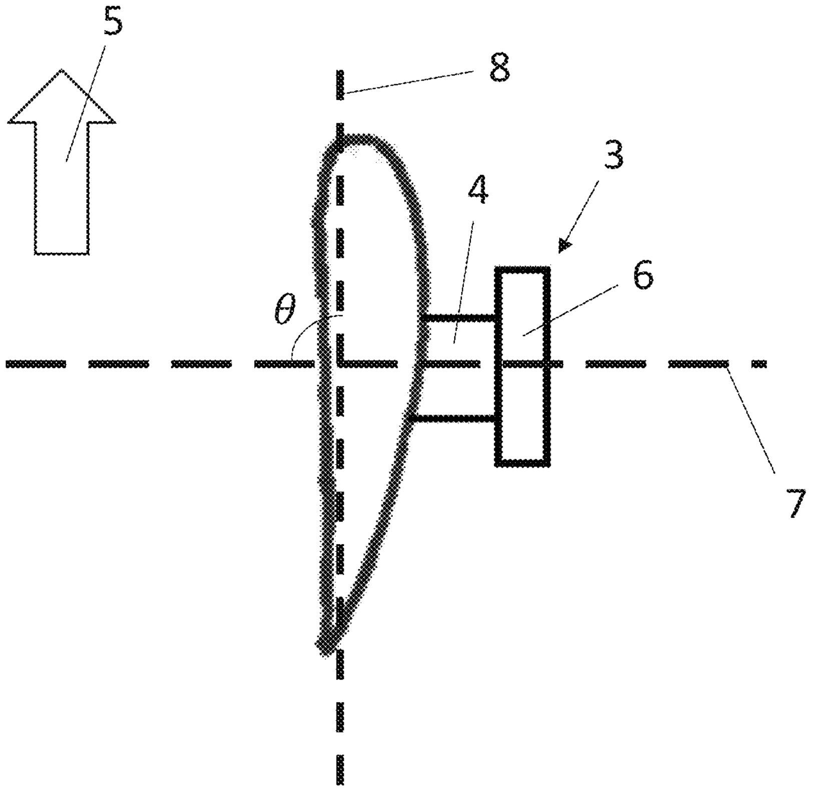
Fig. 2 PRIOR ART
FIG. 2 shows a schematic cross section of a prior art counter-weighted propeller blade in the feathered position.

FIG. 2 shows the propeller blade 1 of FIG. 1 in the feathered position (e.g. the angle θ (pitch angle) between the plane of rotation 7, and the chord 8 of the blade 1 is approximately equal to 90°.

It will be understood that FIGS. 1 and 2 are highly schematic, and do not illustrate the axial twist of the propeller blades. Further, the counter-weight arrangement 3 is shown to protrude in a direction perpendicular to the chord 8 such that when the pitch angle is equal to 90 degrees, the centre of mass of the counter-weight arrangement is exactly aligned with the plane of rotation 7 (i.e. the counter-weight is in the plane of rotation). This arrangement has been illustrated for ease of explanation, and has been carried through to FIGS. 3-6, 9, 10, and 12. It should however be understood that it is not essential that the counter-weight arrangements are configured to completely feather the propeller blades (such that the propeller pitch angle e.g. β¾ angle, is equal to 90 degrees), nor is it essential that the (centre of mass of the) counter-weights are (e.g. completely) inside the plane of rotation when the propeller blade is in a substantially feathered position, or completely outside of the plane of rotation when the propeller blade is in fine pitch.

In summary, it will be understood that counter-weight arrangements are not always configured to fully feather propeller blades, and that the angle at which a counter-weight arrangement extends from the propeller blade may be separately configured for different propeller and/or aircraft designs. Counter-weight arrangements may be specifically configured based on a plurality of factors which may include maximum aircraft speed.

Figure 3:
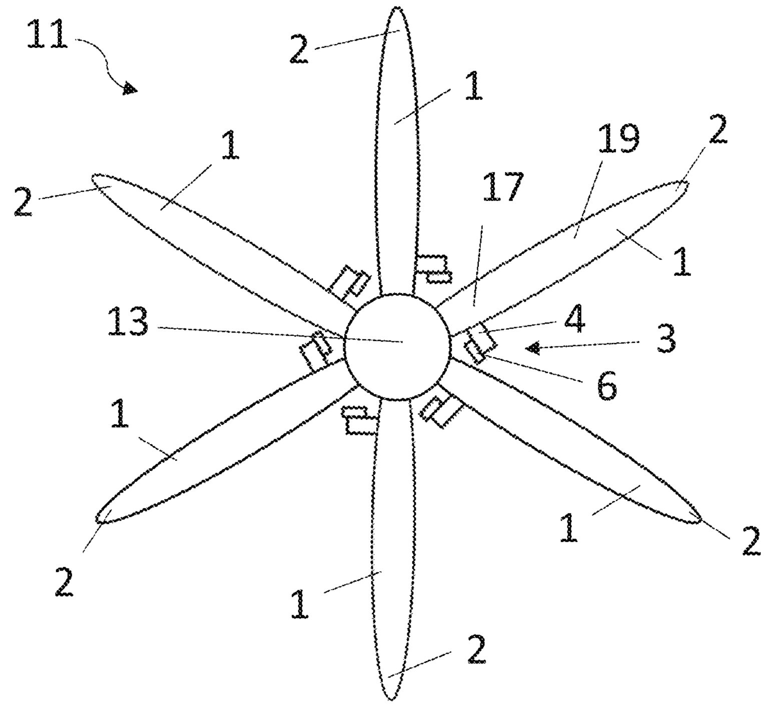
Fig. 3 PRIOR ART
FIG. 3 shows a schematic illustration, in plan view, of a prior art variable pitch aircraft propeller assembly in the feathered position.

FIG. 3 schematically illustrates a conventionally counter-weighted variable pitch aircraft propeller assembly 11 in plan view. The propeller assembly 11 comprises a hub 13, and six propeller blades 1 which extend from the hub 13. Each propeller blade 1 has a blade root 17 which is proximal to the hub 13, and a blade spar 19. The blade spar 19 is the aerofoil section of the blade 1. Each propeller blade 1 has a propeller tip 2 which is the end of the blade spar 19 distal from the hub 13.

Each of the propeller blades 1 has a counter-weight arrangement 3 mounted thereon. The counter-weight arrangements 3 each comprise an arm 4 which protrudes from the blade 1, and a counter-weight 6 mounted at the end of the arm 4. In FIG. 3, the propeller blades 1 are feathered. As such, all of the counter-weights 6 are inside the plane of rotation (the plane of the page in FIG. 3).

Figure 4:
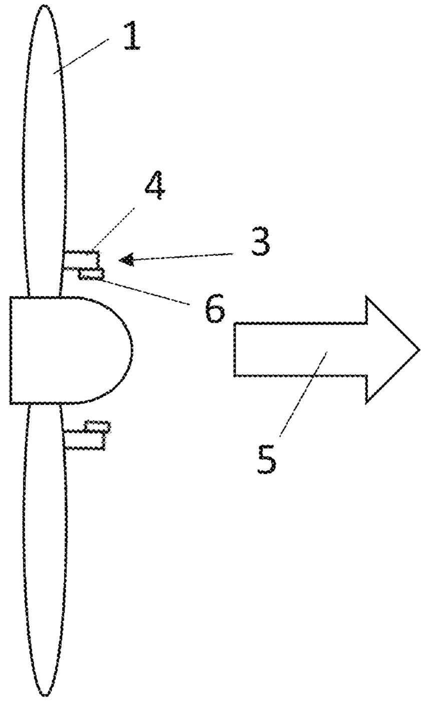
Fig. 4 PRIOR ART
FIG. 4 shows a schematic illustration, in profile view, of a prior art variable pitch aircraft propeller assembly in fine pitch.

FIG. 4 schematically illustrates the propeller assembly 11 of FIG. 3 in profile view. In FIG. 4, the propeller blades are in fine pitch. As such, all of the counter weights are outside the plane of rotation (into/out of the plane of the page in FIG. 4) and protrude ahead of the propeller blades 1 (with respect to the direction of travel 5).

Figure 5:
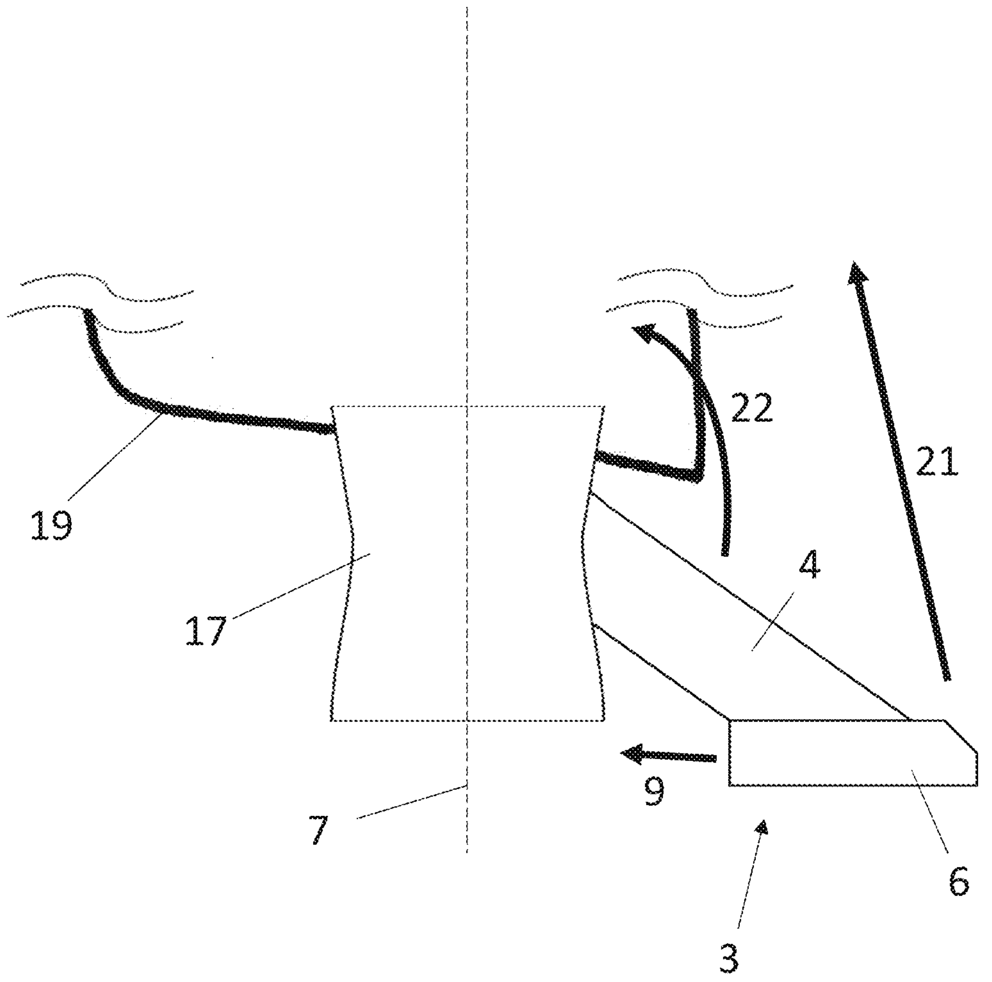
Fig. 5 PRIOR ART
FIG. 5 shows a schematic illustration, in profile view, of a prior art counter-weight arrangement.

FIG. 5 schematically illustrates a counter-weight arrangement 3 mounted on a propeller blade root 17. Propeller blades 1 comprise at least a blade root 17, and a blade spar 19. The blade root 17 and blade spar 19 may be unitarily formed or may be discrete elements. The counter-weight arrangement 3 comprises an arm 4 which protrudes from one side of the blade root 17, and a counter-weight 6 mounted at the end of the arm 4.

As explained above, the counter-weight 6 is arranged such that when the propeller blade 1 is in fine pitch, the counter-weight 6 is outside of the plane of rotation 7, and when the propeller blade 1 is feathered, the counter-weight 6 is inside of the plane of rotation.

As explained in relation to FIGS. 1 and 2, when the propeller is spinning, a component of the centrifugal force on the counter-weight 6 acts to move the counter-weight 6 into the plane of rotation 7, as shown by arrow 9. However, the counter-weight arrangement 3 (i.e. the counter-weight arm 4, and counter-weight 6) also experiences a component of the centrifugal force (shown by arrow 21 in FIG. 5) which is acting to move the counterweight in the direction of the blade tip 2. As such, the counter-weight arrangement 3 exerts a bending force (illustrated by arrow 22 in FIG. 5) on the blade root 17.

This bending force can create high local stresses on the blade root 17 and as such, the blade root 17 may need to be strengthened to account for this high bending stress, leading to increase the mass of the blade root. This issue may be amplified when the counter-weight arrangement is mounted directly onto the blade spar 19, particularly where the blade spar 19 is made from composites.

The Applicant has appreciated the problems associated with this bending force, and as such describes herein a double counter-weight arrangement that is designed to reduce, and in some examples eradicate, the bending force.

Figure 6:
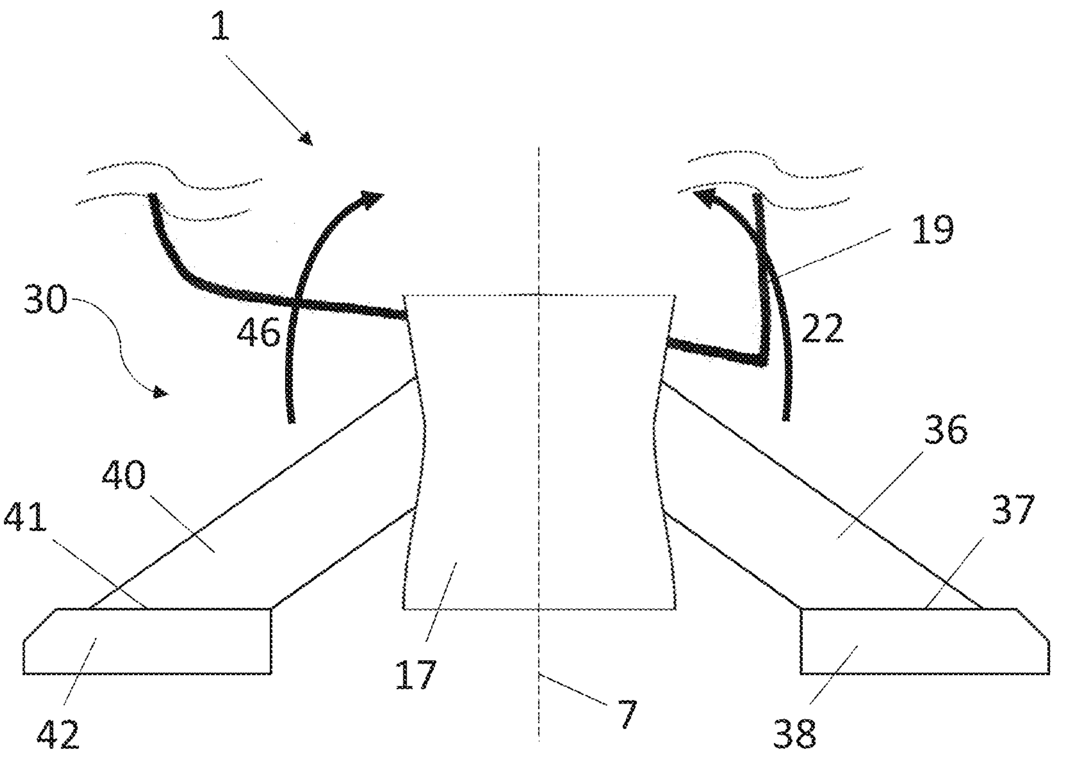
FIG. 6 shows a schematic illustration, in profile view, of a counter-weight arrangement.

FIG. 6 schematically illustrates a double counter-weight arrangement 30 mounted on a propeller blade root 17. The propeller blade 1 comprises a blade root 17, and a blade spar 19. The blade root 17 and blade spar 19 may be unitarily formed or may be discrete elements.

The counter-weight arrangement 30 comprises a first arm 36 which protrudes from the blade 1 (e.g. from the blade root 17), and a first counter-weight 38 mounted at the end 37 of the first arm 36 (i.e. the end of the arm which is distal from the blade root 17). The counter-weight arrangement 30 further comprises a second arm 40 which protrudes from the blade 1 (e.g. from the blade root 17), and a second counter-weight 42 mounted at the end 41 of the second arm 42 (i.e. the end of the arm which is distal from the blade root 17).

The first and second arms 36, 40 protrude in opposite directions from the propeller blade 1 and the first and second arms 36, 40, and first and second counter-weights 38, 42 are arranged such that when the propeller blade 1 is in fine pitch, the first and second counter-weights 38, 42 are both outside of the plane of rotation 7, and when the propeller blade 1 is feathered, the first and second counter-weights 38, 42 are both inside of the plane of rotation 7.

Figure 7:
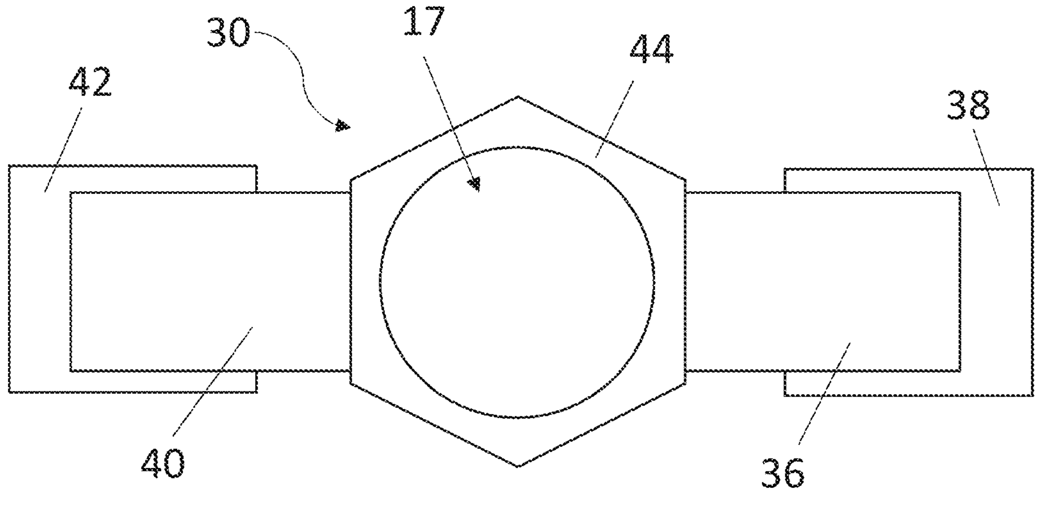
FIG. 7 shows a schematic illustration, in plan view, of the counter-weight arrangement of FIG. 6.

FIG. 7 schematically illustrates the counter-weight arrangement 30 of FIG. 6 in plan view. The counter-weight arrangement 30 comprises a mounting ring 44 which has been omitted from FIG. 6 for clarity, but can be seen in FIG. 7. The mounting ring 44 surrounds the propeller blade 1 (e.g. the blade root 17). The first and second arms 36, 40 extend from the mounting ring 44 such that the mounting ring 44 mounts the first and second arms 36, 40 to the propeller blade 1. The mounting ring 44 may be attached to the propeller blade 1 in any suitable way. For example, the mounting ring 44 may be formed in two halves, and bolted together around the propeller blade 1, clamping the mounting ring 44 onto the propeller blade 1.

The mounting ring 44 and arms 36, 40 may be formed of a metallic material such as steel, aluminium or titanium. The mounting ring 44 and arms 36, 40 may be formed of composites (e.g. carbon fibre). The counter-weights 38, 42 should be formed of a high density material. The counter-weights 38, 42, may be formed of a material (e.g. metallic material) having a density between 15 and 20 g/cm3 (e.g. tungsten or tungsten alloy).

The first and second counter-weights 38, 42 are arranged in opposite positions on either side of the propeller blade 1 (e.g. the longitudinal axis of the propeller blade 1) such that a line drawn between the centre of mass of the first counter-weight and the centre of mass of the second counter-weight perpendicularly bisects a longitudinal axis of the propeller blade. Owing to this symmetry, and with reference to FIGS. 5 and 6, it can be seen that, although the bending force 22 shown in FIG. 5 is also present owing to the first counter-weight 38, an equal and opposite bending force, represented by arrow 46 is present due to the second counter-weight 42. As such, the lateral components of these forces 22, 46 cancel out such that the resultant force is a spanwise axial load acting towards the blade tip 2. Any offset between the centre of mass of the first counter-weight, and the centre of mass of the second counter-weight, would result in a counter-weight arrangement which still produced an overall bending force on the propeller blade 1.

In the illustrated example, the counter-weight arrangement 30 is entirely symmetrical and has a line of symmetry which is parallel to the longitudinal axis of the propeller blade 1.

Figure 8:
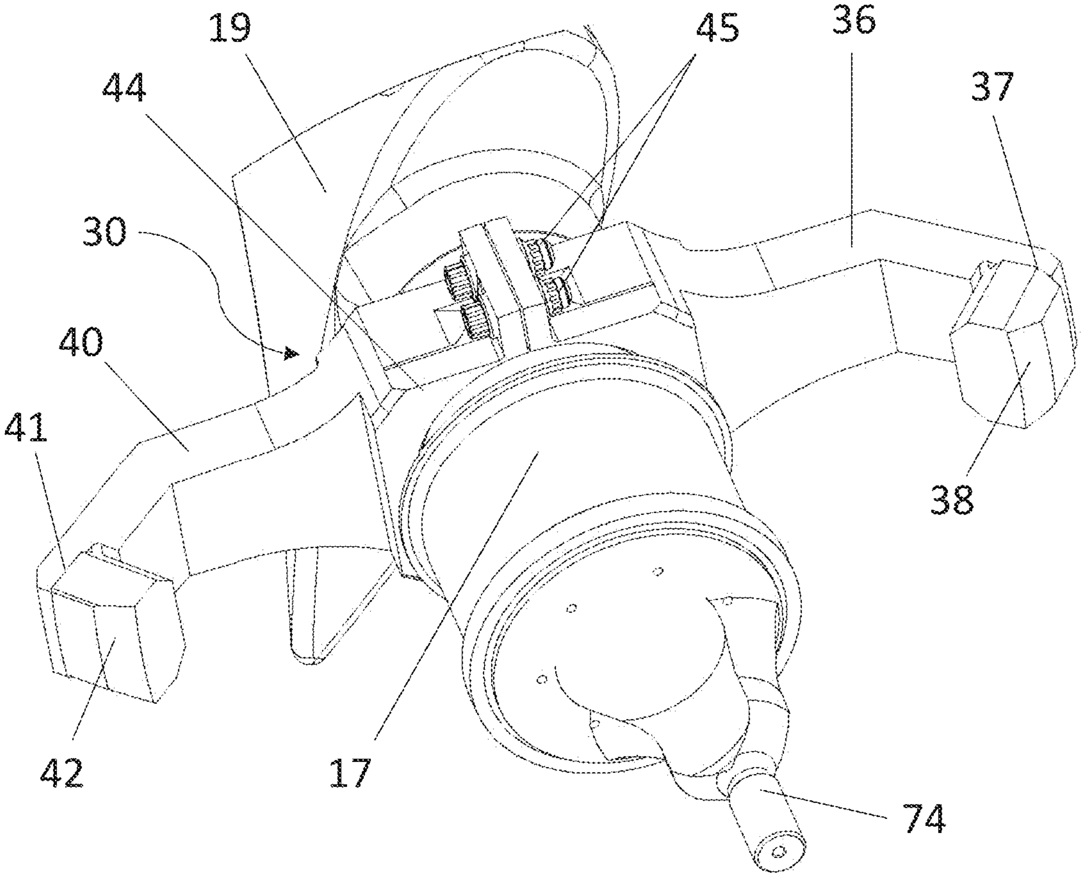
FIG. 8 shows a perspective view of a counter-weight arrangement.

FIG. 8 shows a perspective view of a counter-weight arrangement 30 of the same type as illustrated in FIGS. 6 and 7, according to a specific example. Moving from the mounting ring 44 to their ends 37, 41, the first and second arms 36, 40 initially protrude orthogonally from the blade root 17, and then bend towards the centre of the propeller (away from the blade tip 2) such that the counter-weight arrangement 30 can fit more easily into a spinner (not shown). As can be seen from FIG. 8, the mounting ring 44 is formed in two halves, with each half unitarily formed with an arm 36, 40. The halves are joined by bolts 45. A trunnion 74 can be seen in FIG. 8 extending from the base of the blade root 17 in an off-centre position. The function of this trunnion is discussed in detail below with reference to FIG. 12. It will be understood that other fastening means may be used to join the halves. In examples, the arms 36, 40 may be joined by a hinge on one side, and one or more bolts on the opposite side. In examples, the arms 36, 40 may be joined by a collar which overlaps at least a portion of the arms to hold them in place. Other suitable fastening means are envisaged. It will further be understood that, in examples, the arms 36, 40 may be unitarily formed, and may define a ring into which the blade root 17 may be inserted.

Figure 9:
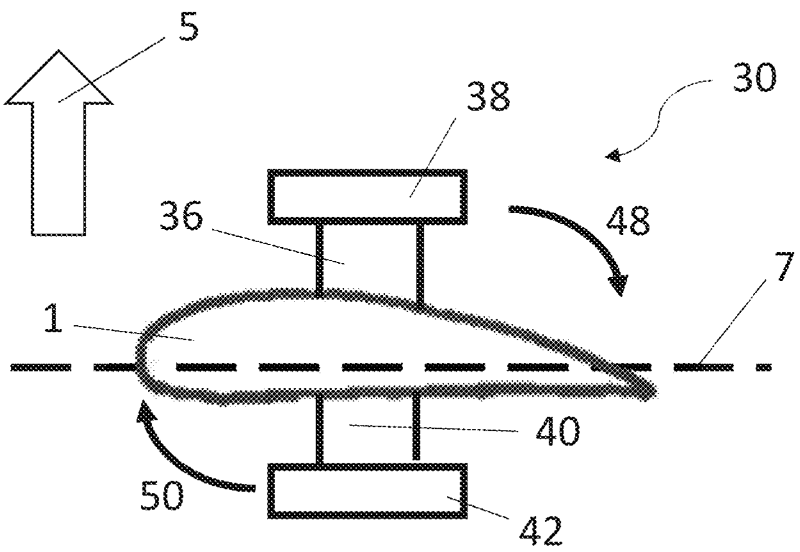
FIG. 9 shows a schematic cross section of a counter-weighted propeller blade according to this disclosure in flat pitch.

FIG. 9 schematically illustrates a propeller blade 1 having a double counter-weight arrangement 30, such as that illustrated in FIG. 6 and FIG. 7, mounted thereon. The arrow 5 illustrates the direction of travel of the aircraft, and the line 7 illustrates the plane of rotation of the propeller.

In FIG. 9, the propeller blade 1 is in flat pitch. As such, both the first counter-weight 38, and the second counter-weight 42 are outside of the plane of rotation 7, in front of and behind the propeller blade 1 respectively (with respect to the direction of travel 5).

When the propeller is spinning, a component of the centrifugal force on the counter-weights 38, 42 acts to move the counter-weights 38, 42 into the plane of rotation 7, as shown by arrows 48 and 50. As such, the centrifugal force on the counter-weight arrangement 30 acts to bias the propeller blade 1 towards the feathered position.

Figure 10:
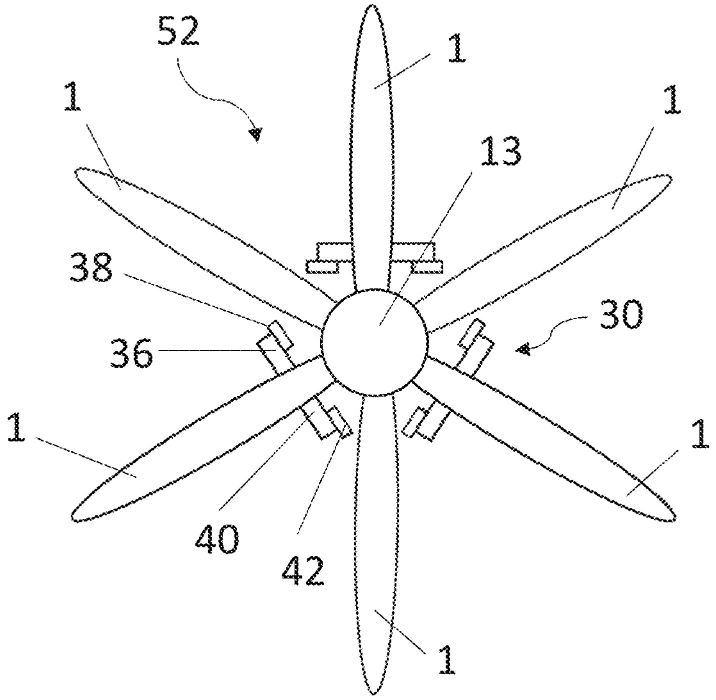
FIG. 10 shows a schematic illustration, in plan view, of a variable pitch aircraft propeller assembly in the feathered position.

FIG. 10 schematically illustrates a double counter-weighted variable pitch aircraft propeller assembly 52 in plan view. The propeller assembly 52 comprises a hub 13, and six propeller blades 1 which extend from the hub 13. The propeller assembly 52 varies from the propeller assembly 11 shown in FIG. 3 in that only every-other propeller blade has a counter-weight arrangement 30 mounted thereon. The counter-weight arrangements are double counter-weight arrangements, such as the counterweight arrangement 30 of FIGS. 6 and 7, and each comprise first and second arms 36, 40, and first and second counter-weights 38, 42.

Figure 11:
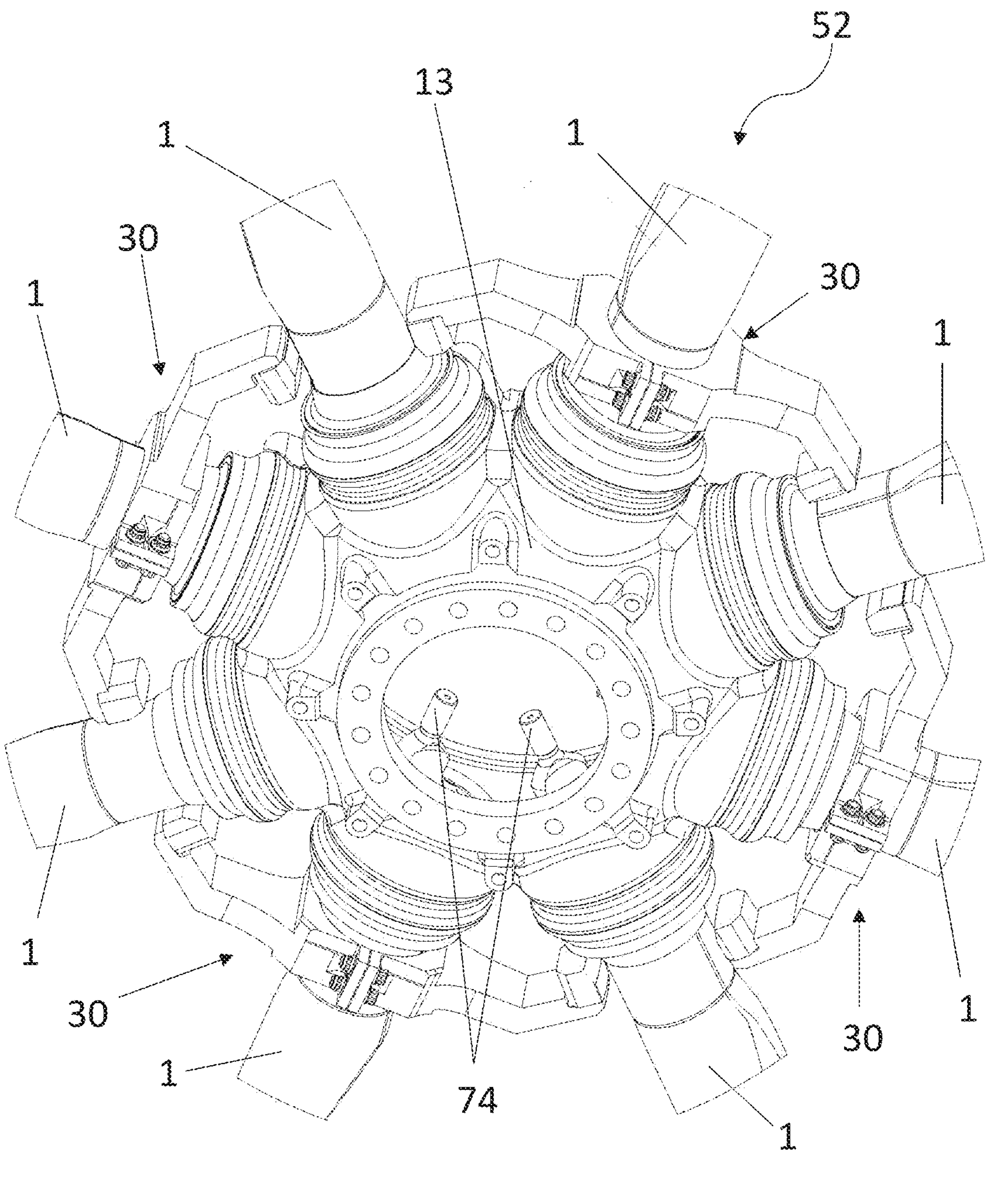
FIG. 11 shows a perspective view of an aircraft propeller assembly.

FIG. 11 is a perspective view of a double counter-weighted variable pitch aircraft propeller assembly 52 according to a specific example. The propeller assembly 52 comprises a hub 13, and eight propeller blades 1 which extend from the hub 13. Like FIG. 10, in the propeller assembly 52 of FIG. 11, every-other propeller blade has a counter-weight arrangement 30 mounted thereon. The counter-weight arrangements are double counter-weight arrangements, such as the counterweight arrangement 30 of FIG. 8, and each comprise first and second arms 36, 40, and first and second counter-weights 38, 42.

It is visible from FIG. 11 that on a propeller assembly with a small number of blades (e.g. three or possibly four) it may be possible to have a double counter-weight arrangement 30 on each blade 1, but on a propeller assembly with a larger number of blades (e.g. six, eight, etc) it is not possible to have a double counter-weight arrangement 30 on each blade 1 without adjacent counter-weight arrangements interfering with one another.

Whilst it may be possible to introduce offsets into the counter-weight arrangements, such that adjacent counter-weight arrangements do not interfere with one another, this lack of symmetry of the first and second counter-weights would introduce an imbalance to the propeller blade 1 and/or still produce an overall bending force on the propeller blade 1 as explained above in relation to FIG. 6. Further, the need to introduce offsets may reduce the overall volume which could be occupied by the counter-weight which may reduce the performance of the counter-weight.

Since only every other blade 1 of the propeller assembly 52 has a counter-weight arrangement 30 mounted thereon, the torsional force (torque) generated by each counter-weight arrangement must be at least double the torsional force (torque) which would be generated by a single counter-weight arrangement 3 such that the total torsional force (torque) biasing all propeller blades 1 towards the feathered position is equal both for a propeller assembly 52 having a double counter-weight arrangement 30 mounted on every other blade 1, and for a propeller assembly 11 having a single counter-weight arrangement 3 mounted on every blade 1, i.e.

$$n/2\times\text{Double-CWT}=n\times\text{Single-CWT}$$

Where n is the number of counter-weight arrangements in the propeller assembly, Double-CWT is the torque generated as a result of a double counter-weight arrangement, and Single-CWT is the torque generated as a result of a single counter-weight arrangement.

As in FIG. 3, in FIGS. 10 and 11, the propeller blades 1 are feathered. As such, all of the counter-weights 38, 42 are inside the plane of rotation (the plane of the page in FIG. 9).

Figure 12:
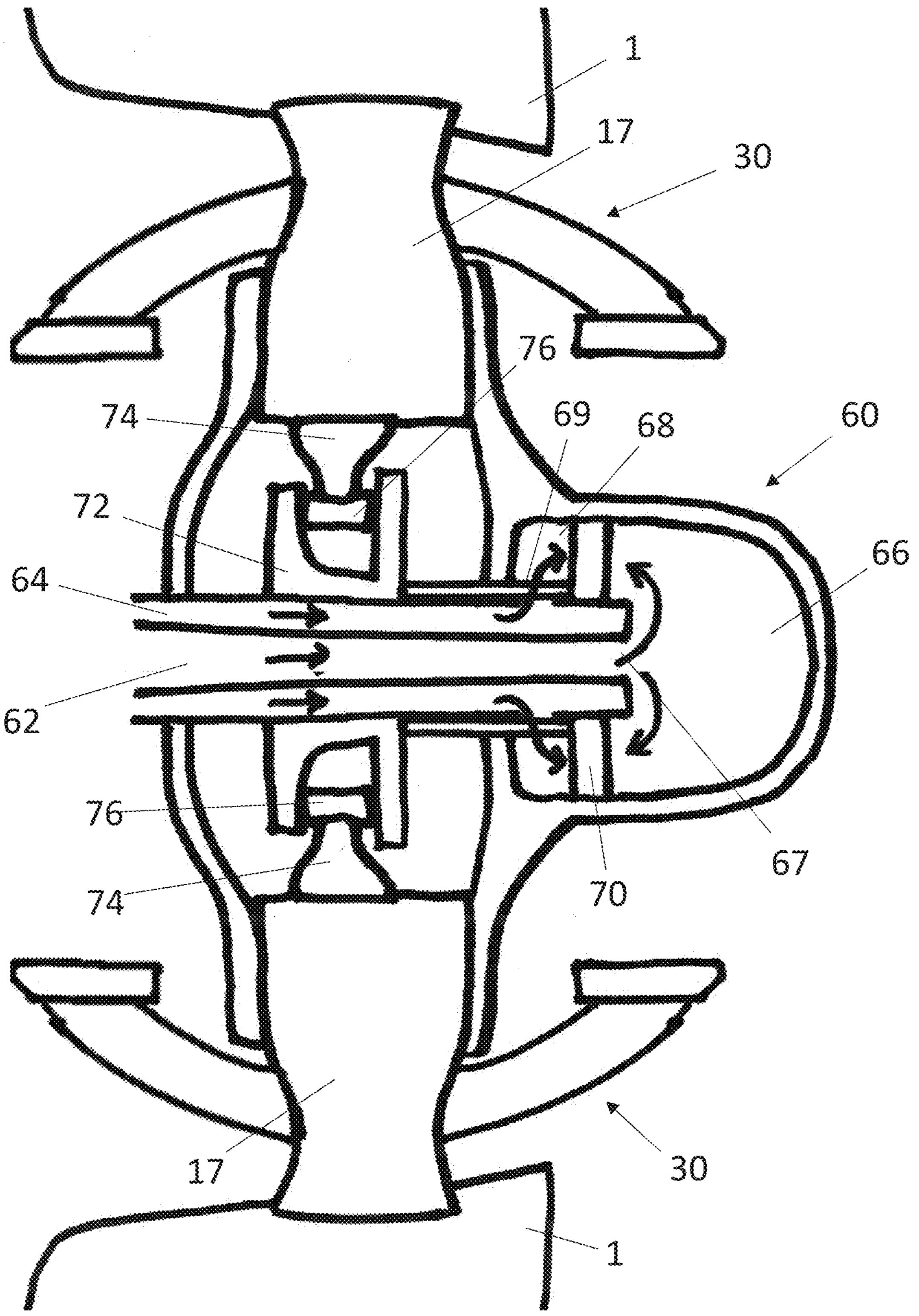
FIG. 12 shows a schematic illustration of an actuator.

FIG. 12 schematically illustrates a cross section through an actuator 60 with two propeller blades 1 linked to the actuator 60. The actuator 60 is a hydraulic actuator, but in examples, other actuators, such as electrical actuators, may be used. The actuator 60 comprises a first hydraulic tube 62, and a second hydraulic tube 64 which concentrically surrounds the first hydraulic tube 62.

The first hydraulic tube 62 is in fluid communication with a first actuator chamber 66 via outlet 67, and the second hydraulic tube 64 is in fluid communication with a second actuator chamber 68 via outlet 69. Although outlet 69 appears to be two holes in the cross section of FIG. 12, it will be understood that outlet 69 is actually an annular slot in the second hydraulic tube 64.

The first and second actuator chambers 66, 68 are separated by piston 70. The pressure in the first actuator chamber 66 acts to push the piston 70 in a first direction (to the left in FIG. 12), the pressure in the second actuator chamber 68 acts to push the piston is a second direction (to the right in FIG. 12). The piston 70 is coupled to an annular yoke 72.

Each propeller blade 1 has a trunnion 74 protruding from the blade root 17 in a direction parallel to the longitudinal axis of the blade 1, but offset from the longitudinal axis (e.g. off centre). The arrangement of the trunnion 74 can be more clearly seen in FIG. 8.

Each trunnion 74 comprises a trunnion roller 76 provided between the surface of the trunnion 74 and the surface of the yoke 72 to aid movement of the trunnion 74 with respect to the yoke 72. Since the piston 70 is coupled to the yoke 72, when the piston 70 moves, the yoke 72 moves. The yoke 72 therefore acts on the trunnion 74 of each blade 1, and since the trunnions 74 are off centre, this movement results in a twisting of the blades 1, adjusting their pitch.

Since all of the blades 1 are connected to the same hydraulic actuator, each blade 1 always has the same pitch. As such, in a propeller assembly such as the propeller assembly of FIG. 9, where not every blade 1 has a counter-weight arrangement 30 mounted thereon, the force generated by the counter-weight arrangements 30 acts to bias all of the blades 1 to the feathered position, via the common hydraulic actuator 60.

As has been explained above, the counter-weight arrangements 30 act to bias the blades 1 towards a feathered position. The second hydraulic tube 64 and second actuator chamber 68 contain pressurised oil which acts (via the piston 70 and yoke 72) to decrease the pitch of the blades 1, against the biasing force of the counter-weight arrangements 30. The first hydraulic tube 62 and first actuator chamber 66 contain pressurised oil which acts (via the piston 70 and yoke 72) to increase the pitch of the blades 1, acting with the biasing force of the counter-weight arrangements 30.

In examples, the actuator 60 is capable of providing enough force to increase the pitch of all blades 1 in the event of a single blade counter-weight arrangement 30 failure/loss. In examples, the actuator 60 is capable of providing enough force to increase the pitch of all other blades 1 in the event of a single blade trunnion failure (e.g. all blades but the blade with the failed trunnion may still be feathered). Said force is provided via the oil in the first hydraulic tube 62 and first actuator chamber 66.

It will therefore be seen that the aircraft propeller assembly and counter-weight arrangement of the present disclosure has the potential to reduce the bending stress induced by counter-weight arrangements on aircraft propeller blades. This may allow the propeller blades to be made lighter.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the

What is claimed is:

1. A variable pitch aircraft propeller assembly comprising:

a plurality of propeller blades each configured to rotate in a plane of rotation so as to generate thrust in a direction perpendicular to the plane of rotation, wherein each propeller blade of the plurality of propeller blades is configured to be linked to an actuator which controls the pitch of each propeller blade of the plurality of propeller blades, wherein the propeller assembly includes at least six propeller blades; and at least one counter-weight arrangement mounted on at least one propeller blade of the plurality of propeller blades, the at least one counter-weight arrangement comprising:

a first counter-weight; and a second counter-weight;

wherein the first and second counter-weights are arranged such that when the at least one propeller blade is in fine pitch, the counter-weights are in a first position with respect to the plane of rotation of the at least one propeller blade, and when the at least one propeller blade is substantially feathered, the at least one counter-weights are in a second position with respect to the plane of rotation of said propeller blade; and wherein the counter-weights are aligned such that a line drawn between the center of mass of the first counter-weight and the center of mass of the second counter-weight is perpendicular to a longitudinal axis of the propeller blade; and wherein the counter-weights are arranged only on every other propeller blade.

2. The variable pitch propeller assembly as claimed in claim 1, wherein the second position is closer to the plane of rotation than the first position.

3. The variable pitch propeller assembly as claimed in claim 1, wherein the counter-weights are aligned such that the line drawn between the center of mass of the first counter-weight and the center of mass of the second counter-weight perpendicularly bisects the longitudinal axis of the propeller blade.

4. The variable pitch aircraft propeller assembly as claimed in claim 1, wherein the counter-weight arrangement comprises a first arm protruding from the propeller blade and comprising the first counter-weight mounted thereon, and a second arm protruding from the propeller blade and comprising the second counter-weight mounted thereon.

5. The variable pitch aircraft propeller assembly as claimed in claim 1, wherein the assembly comprises an even number of propeller blades, and wherein every other propeller blade has a counter-weight arrangement mounted thereon.

6. The variable pitch aircraft propeller assembly as claimed in claim 1, wherein the counter-weight arrangement is symmetrical about the longitudinal axis of the propeller blade on which it is mounted.

7. The variable pitch aircraft propeller assembly as claimed in claim 1, wherein each of the plurality of propeller blades is configured to be linked to a common actuator.

8. The variable pitch aircraft propeller assembly as claimed in claim 1, wherein the counter-weights comprise a material having a density between 15 and 20 $g/cm^3$.

9. The variable pitch aircraft propeller assembly as claimed in claim 1, in combination with one or more actuators configured to adjust a pitch of one or more of the propeller blades.

10. A system as claimed in claim 9, comprising a common actuator configured to adjust the pitch of each of the propeller blades.

11. The system as claimed in claim 10, wherein the actuator is bi-directional.

12. The system as claimed in claim 11, wherein the actuator system is configured to provide sufficient force to substantially feather the propeller blades in the event of a single blade counter-weight arrangement failure or loss.

13. The system as claimed in claim 9, wherein at least one of the one or more actuators is a hydraulic actuator.

14. The system as claimed in claim 9, wherein at least one of the one or more actuators is an electrical actuator.

15. A counter-weight arrangement for use in a variable pitch propeller assembly comprising a plurality of blades configured to rotate in a common plane of rotation so as to generate thrust in a direction perpendicular to the plane of rotation, the counter-weight arrangement comprising:

a first counter-weight; and a second counter-weight;

wherein the counter-weights are arranged such that when the counter-weight arrangement is installed on a propeller blade, and the propeller blade is in fine pitch, the counter-weights are in a first position with respect to the common plane of rotation, and when the propeller blade is substantially feathered, the counter-weights are in a second position with respect to the plane of rotation, wherein the counter-weights are aligned such that a line drawn between the center of mass of the first counter-weight and the center of mass of the second counter-weight is perpendicular to a longitudinal axis of the propeller blade; and wherein the counter-weights are arranged only on every other propeller blade;

wherein the propeller assembly includes at least six propeller blades.

* * * * *